(12) United States Patent
Hanyu

(10) Patent No.: US 6,332,642 B1
(45) Date of Patent: Dec. 25, 2001

(54) VEHICLE BODY STRUCTURE

(75) Inventor: Atsushi Hanyu, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/654,880

(22) Filed: Sep. 5, 2000

(30) Foreign Application Priority Data

Sep. 17, 1999 (JP) .................................................. 11-264514

(51) Int. Cl.⁷ ...................................................... B60J 7/00
(52) U.S. Cl. ............................ 296/203.02; 296/203.01; 296/194; 296/198
(58) Field of Search .............................. 296/203.02, 194, 296/198, 203.01

(56) References Cited

U.S. PATENT DOCUMENTS

| | | | |
|---|---|---|---|
| 4,408,794 | * 10/1983 | Harasaki | 296/198 |
| 4,717,198 | * 1/1988 | Komatsu | 296/194 |
| 4,750,780 | * 6/1988 | Harasaki et al. | 296/194 |
| 4,763,948 | * 8/1988 | Harasaki | 296/194 |
| 4,789,198 | * 12/1988 | Ide | 296/194 |
| 4,886,314 | * 12/1989 | Maeda | 296/194 |
| 5,011,201 | * 4/1991 | Takahashi et al. | 296/194 |
| 5,031,958 | * 7/1991 | Fujita et al. | 296/194 |
| 5,052,742 | * 10/1991 | Akoshima et al. | 296/194 |
| 5,061,009 | * 10/1991 | Harasaki et al. | 296/194 |
| 5,102,164 | * 4/1992 | Fujinaka et al. | 296/194 |
| 5,346,276 | * 9/1994 | Enning et al. | 296/194 |
| 6,209,950 | * 4/2001 | Hanyu | 296/194 |

FOREIGN PATENT DOCUMENTS 6-329050    11/1994   (JP) .

* cited by examiner

Primary Examiner—Joseph D. Pape
Assistant Examiner—Kiran B. Patel
(74) Attorney, Agent, or Firm—McDermott, Will & Emery

(57) ABSTRACT

The vehicle body structure includes a suspension attachment member (1), a suspension housing member (5) and a hood-ridge upper member (3) all formed into one casting body of light metal, constituting a suspension attachment structure (S). In the structure (S), the suspension attachment member (1) is attached to a suspension suspended from a vehicle body to carry a vehicle wheel. The housing member (5) has an upper part joined to the suspension attachment member (1) and the lower part connected to a side member (7) constituting a lower framework of the vehicle body. The hoodridge upper member (3) is combined with the upper part of the housing member (5), on its outer side in the vehicle's width direction, constituting an upper framework of the vehicle body. Further, the hood-ridge upper member (3) has an upper wall (3c), a lower wall (3d) and a longitudinal wall (3e) positioned inside in the vehicle's width direction, having a cross section opening outward in the vehicle's width direction.

7 Claims, 5 Drawing Sheets

VEHICLE BODY STRUCTURE

BACKGROUND OF THE INVENTION

1. Field of the Invention

The present invention relates to a body structure of a vehicle. More particularly, it relates to the body structure for an automotive front suspension attachment member whose vicinities are formed into one casting body of light metal or the like.

2. Description of Related Art

As the above-mentioned body structure where the suspension attachment member and the vicinities are integrally formed by a casting of light metal etc., there is a conventional body structure disclosed in Japanese Patent Unexamined Publication (kokai) No. 6-329050.

In the body structure, a suspension attachment member and a hood-ridge upper member are formed into one casting body of light metal, such as aluminum alloy. In assembly, the suspension attachment member is attached to a suspension suspended from a vehicle body to carry a vehicle wheel. Similarly, a housing member is formed of a casting of light metal, such as aluminum alloy. In assembly, the suspension attachment member and the hood-ridge upper member as one body are welded to the housing member.

Thus, when the vehicle body is made from castings of light metals, it is possible to reduce the number of components and the weight of the vehicle body.

In the above-mentioned body structure, however, the housing member is another element than one casting body having of the suspension attachment member and the hood-ridge upper member, persistently. Therefore, it has been required to weld the housing member to the suspension attachment member and the hood-ridge upper member on a factory's main line to produce the vehicle bodies, causing the problem of a troublesome welding work.

Moreover, since the hood-ridge upper member of the above body structure is shaped so as to open downward (i.e. inverse U-shaped cross section), to ensure the member's bending rigidity against a force exerted on the suspension, namely, suspension input requires to increase a plate thickness of the upper wall constituting the hood-ridge upper member. Therefore, there is a limit of the vehicle body to be light-weighted.

SUMMARY OF THE INVENTION

Under the above circumstance, it is an object of the present invention to provide a body structure which is capable of simplifying the assembling operation and which allows the vehicle to be light-weighted furthermore.

According to the invention, the above-mentioned object is accomplished by a vehicle body structure, comprising:

a suspension suspended from a vehicle body to carry a vehicle wheel;

a suspension attachment member to which the suspension is attached;

a suspension housing member for accommodating the suspension, the suspension housing member having its upper part joined to the suspension attachment member and the lower part to be connected to a side member constituting a lower framework of the vehicle body;

a hood-ridge upper member joined to an upper and outer part of the suspension housing member thereby to constitute an upper framework of the vehicle body, the upper and outer part being positioned on the outside of the suspension housing member in a vehicle's width direction; wherein the suspension housing member and the hood-ridge upper member are formed into one casting body of light metal; and the hood-ridge upper member includes an upper wall, a lower wall and a vertical wall positioned inside in the vehicle's width direction to connect the upper wall with the lower wall, providing a cross section opening outward in the vehicle's width direction.

DESCRIPTION OF THE PREFERRED EMBODIMENT

FIGS. 1 to 7 illustrate the first embodiment of the present invention.

Figure 1:
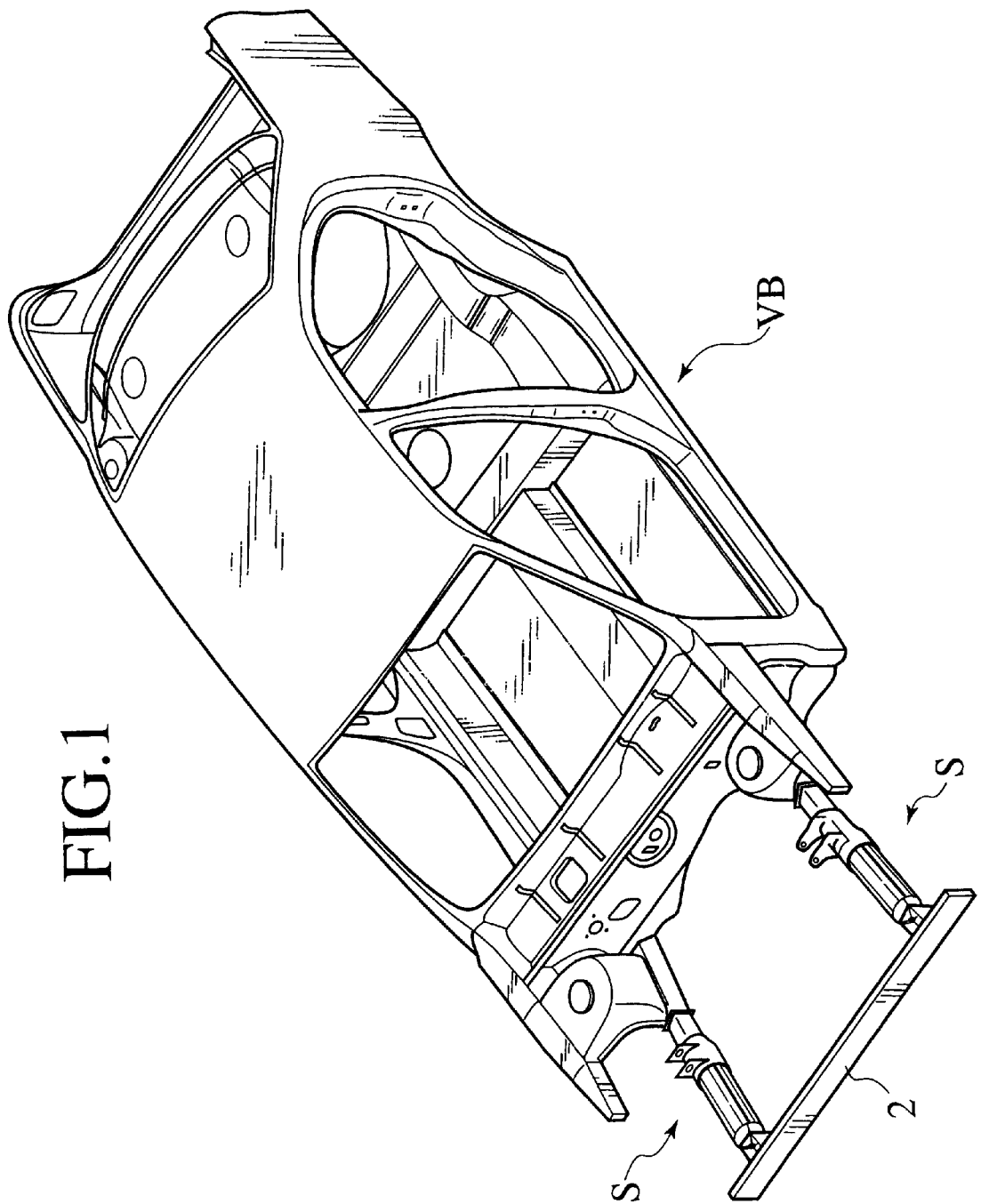
FIG. 1 is a perspective view of the overall outward appearance of a vehicle body to which the present invention is to be applied.

FIG. 1 illustrates a vehicle body VB. In the vehicle body VB, its front section has a pair of suspension attachment structures S arranged on both sides of the body VB. Note that respective front ends of the structures S are connected to a cross member 2 which extends in a direction of a width of the vehicle body VB. Note that the above direction will be referred as "vehicle's width direction", below.

Figure 2:
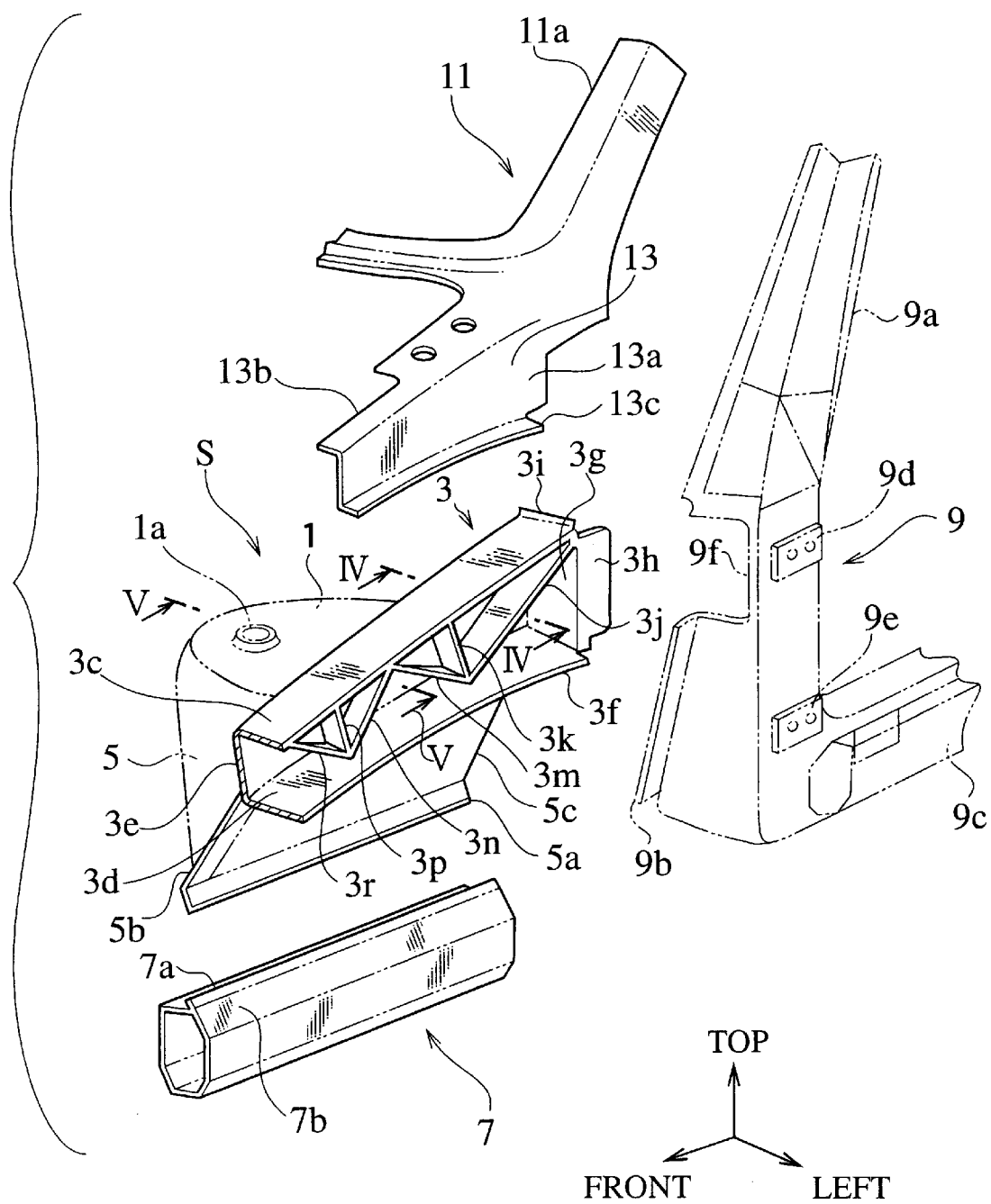
FIG. 2 is an overall exploded perspective view of a body structure in accordance with the first embodiment of the invention.

FIG. 2 shows one suspension attachment structure S on the left side of the vehicle body VB. As shown in the figure, the suspension attachment structure S comprises a suspension attachment member 1, a hood-ridge upper member 3 and a housing member 5. According to the invention, all of these members 1, 3 and 5 are collectively formed into one casting body of light metal, for example, aluminum alloy, manganese alloy, etc.

In the structure S, the suspension attachment member 1 is an element to be attached to a suspension SA (FIG. 5) allowing a wheel (not shown) to carry the vehicle body VB. Thus, the suspension attachment member 1 is provided, thereon, with a suspension attachment hole 1a for engagement with the suspension SA.

The upper part (periphery) of the housing member 5 is integrated with the suspension attachment member 1. The housing member 5 is further provided, on its lower part, with a flange 5a for connection with a side member 7 constituting a lower framework of the vehicle body VB. On the front side of the housing member 5, a flange 5b is formed for connection with a hood-ridge lower member (not shown). On the rear side of the housing member 5, a flange 5c is formed for connection with a front pillar structure 9.

The hood-ridge upper member 3 is connected with the upper and outer (in the vehicle's width direction) part of the housing member 5. The hood-ridge upper member 3 is formed so as to extend in a front/behind direction of the vehicle, constituting an upper framework of the vehicle body VB. Note that the above front/behind direction will be referred as "vehicle's frond/behind", below.

The hood-ridge upper member 3 has an upper wall 3c, a lower wall 3d and a vertical wall 3e connecting the upper wall 3c with the lower wall 3d, providing a substantial U-shaped cross section. The lower wall 3d is formed somewhat longer than the upper wall 3c in the vehicle's width direction, thereby providing a joint flange 3f for connection with a roof structure 11 mentioned later. The rear end of the hood-ridge upper member 3 is blocked up with a rear wall 3g. The rear wall 3g has a joint flange 3h formed outside in the vehicle's width direction and a pair of joint flanges 3i formed on upper and lower parts of the wall 3g to extend in the vehicle's width direction. Note, the lower joint flange 3i is not illustrated in FIG. 2. These joint flanges 3h, 3i are provided to connect the structure S with the front pillar structure 9.

Inside the so-constructed hood-ridge upper member 3, a plurality of reinforcement ribs 3j, 3k, 3m, 3n, 3p and 3r are formed so as to extend in the vehicle's width direction. Each rib (3j, 3k, 3m, 3n, 3p, 3r) is joined to the upper wall 3c, the lower walls 3c, 3d and also the vertical wall 3e. The rib 3j is further joined to the rear wall 3g.

Repeatedly, the side member 7 connected with the underside of the suspension attachment structure S constitutes the lower framework of the vehicle body VB. The side member 7 is arranged so as to extend in the vehicle's front/behind direction, which is similar to the hood-ridge upper member 3. The side member 7 is made from an extrusion of light metal (e.g. aluminum alloy, manganese alloy) and has a closed sectional structure. At the outer and upper corner of the side member 7, a joint flange 7a is formed so as to project obliquely upward, but inward in the vehicle's width direction. Further, the side member 7 has a similarly-inclined joint surface 7b formed to succeed to the joint flange 7a. In this embodiment, both joint flange 7a and joint surface 7b of the side member 7 constitute both up and down connecting parts for connection with the housing member 5 for accommodating the suspension SA.

The front pillar structure 9 is provided, on an upside thereof, with a front pillar inner part 9a. On the inner and lower side of the structure 9, a joint flange 9b is formed for connection with the joint flange 5c on the rear side of the housing member 5 of the structure S. At the vertically-intermediate position of the front pillar structure 9, a joint recess 9f is formed to join the structure 9 with the hood-ridge upper member 3. Further, the front pillar structure 9 has a side sill 9c of a closed section, formed to extend in the vehicle's front/behind direction on the lower side of the structure 9. Reference numerals 9d and 9e denote respective door fittings.

The roof structure 11 has a front pillar outer part 11a formed to fit with the external face of the front pillar inner part 9a of the structure 9. The front pillar outer part 11a also constitutes a panel extending from the roof along an external surface of a front pillar of the vehicle. This front pillar outer part 11a is combined with the front pillar inner part 9a thereby to define one structure having a closed section.

The lower end of the front pillar outer part 11a is further extended to define a joint wall 13. The joint wall 13 provided with a vertical wall 13a, an upper flange 13b and a lower flange 13c.

In assembling, the rear part of the hood-ridge upper member 3 is inserted into the joint recess 9f of the front pillar structure 9 and further, the joint flange 3h is laid on the sidewall of the front pillar structure 9 from within in the vehicle's width direction. Then, the joint flange 3h is welded to the sidewall. Although only the upper flange 3i is shown in the figure, both of the joint flanges 3i are laid on upper and lower sides of the joint recess 9f respectively, from the front side of the vehicle, Next, these joint flanges 3i are welded to the vicinities of the recess 9f.

The joint flange 5c of the housing member 5 is welded to the joint flange 9b of the front pillar structure 9, while the joint flange 5a of the member 5 is welded to the joint flange 7a and the joint surface 7b of the side member 7.

The joint flange 5b of the housing member 5 is united with the not-shown hood-ridge lower member by means of welds, bolts or the like.

Further, the front pillar outer part 11a of the roof structure 11 is welded to the front pillar inner part 9a of the front pillar structure 9. Similarly in the joint wall 13 at the lowermost end of the roof structure 11, the vertical wall 13a is overlapped on the rear part of the opening of the hood-ridge upper member 3 outward in the vehicle's width direction. In this state, the upper joint flange 13b is laid on the upper wall 3c of the member 3 for welding joint, while the lower joint flange 13c is laid on the joint flange 3f of the lower wall 3d of the member 3 for welding joint.

Figure 3:
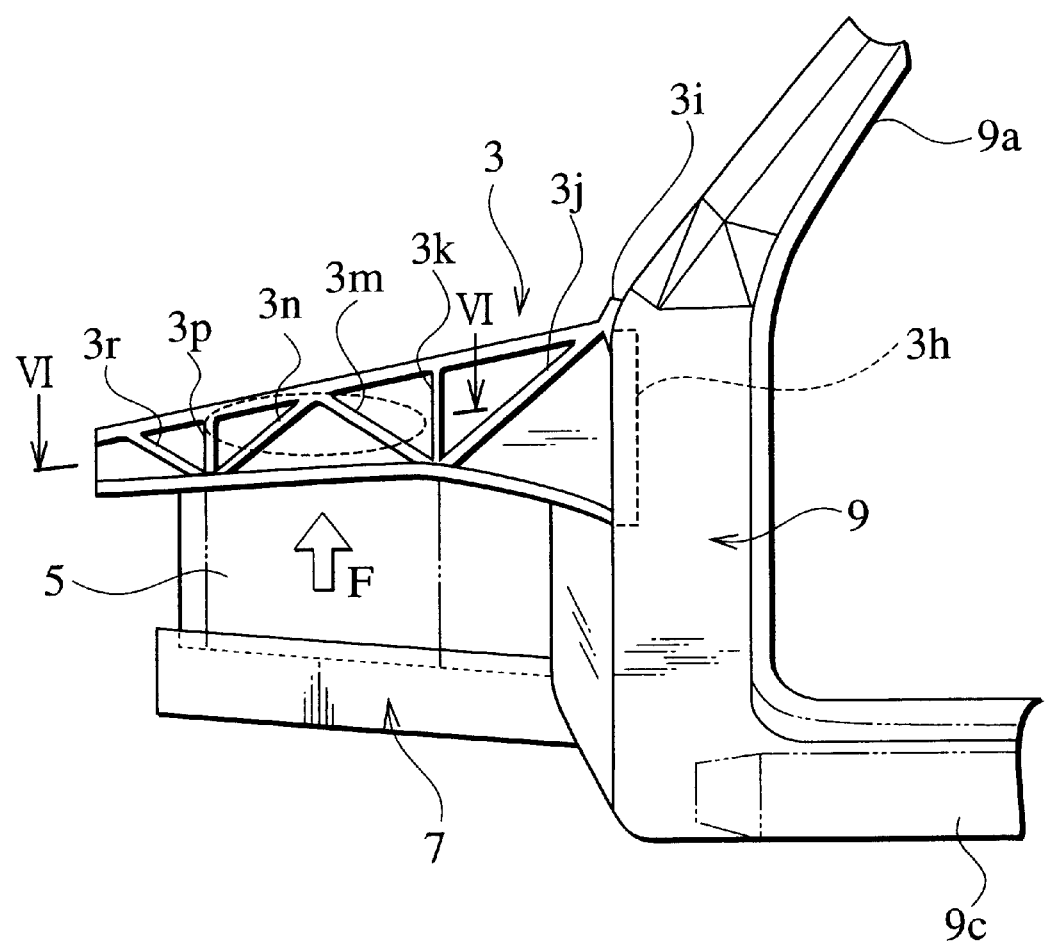
FIG. 3 is a partially-omitted side view of the body structure of the first embodiment, in its assembled condition.
Figure 4:
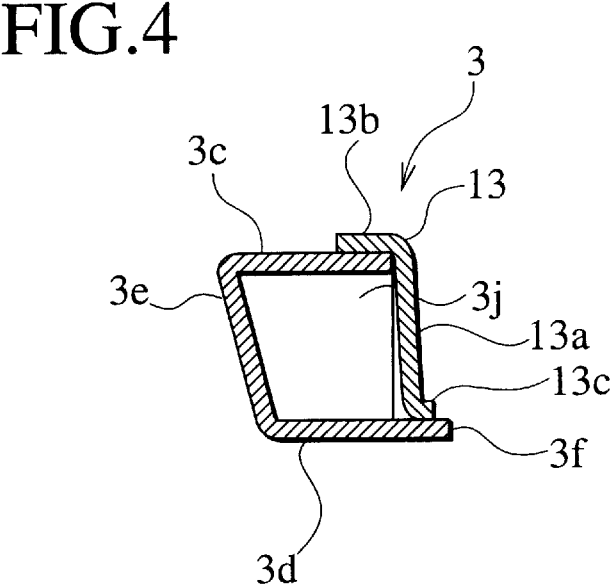
FIG. 4 is a sectional view taken along a line IV—IV of FIG. 2.

FIG. 3 shows a side view of the so-obtained joint structure. Further, FIG. 4 is a sectional view of the joint structure, taken along a line IV—IV of FIG. 2. FIG. 4 obviously illustrates the above-mentioned arrangement where the outward opening of the hood-ridge upper member 3 is closed up with the vertical wall 13a of the joint wall 13 and the upper joint flange 13b is welded to the upper wall 3c of the member 3, while the lower joint flange 13c is welded to the joint flange 3f of the lower wall 3d of the member 3.

Figure 5:
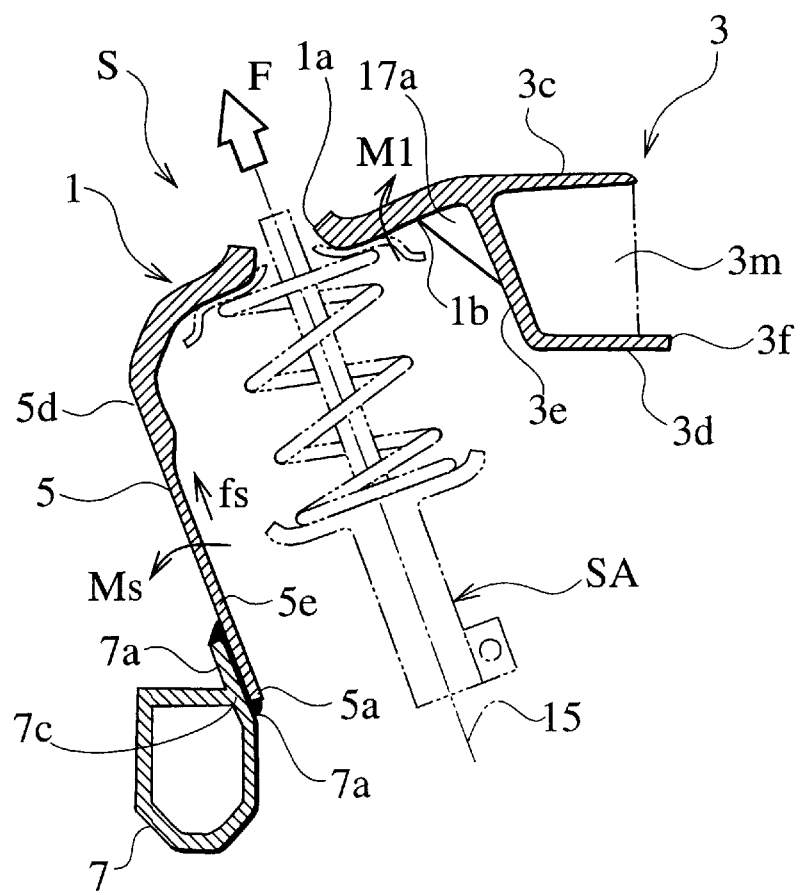
FIG. 5 is a sectional view taken along a line V—V of FIG. 2.

As shown in FIG. 5, the suspension SA is attached to the suspension attachment member 1 along an attachment axis 15 extending obliquely to the vehicle's width direction. Thus, the suspension attachment member 1 is also inclined so as to be substantially perpendicular to the attachment axis 15. The suspension attachment member 1 and an inside upper wall 5d of the housing member 5 are formed thicker than an inside lower wall 5e of the same member 5. Additionally, on the character as the framework member of the vehicle body, the hood-ridge upper part 3 and the side member 7 are formed somewhat thicker than the lower wall 5e.

The vertical wall 3e of the hood-ridge upper part 3, the upper and lower walls 7a, 7b of the housing member 5 and the joint flange 7a and the joint surface 7b of the side member 7 are all inclined to be substantially parallel with the attachment axis 15 of the suspension SA.

Further, the above suspension attachment member 1 is provided with a supplementary rib 17a which extends between a lower wall 1b and the vertical wall 3e of the hood-ridge upper member 3. Across the vertical wall 3e of the hood-ridge upper member 3, the rib 17a is adjacent to the rib 3m in the member 3. In the vehicle's width direction, the supplementary rib 17a is also positioned so as to overlap with the rib 3m partially.

Figure 6:
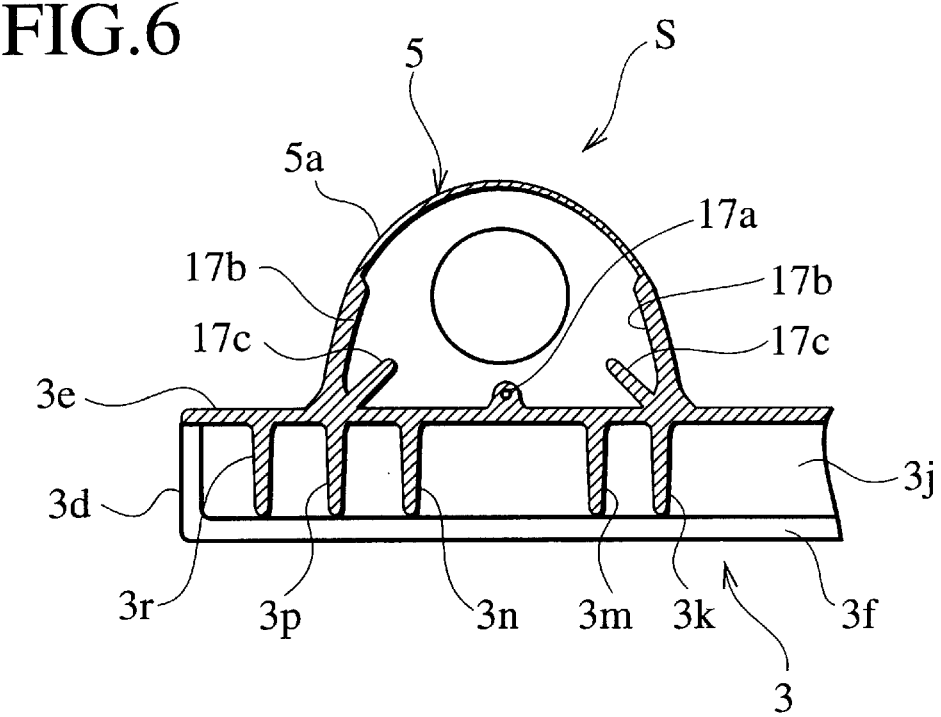
FIG. 6 is a sectional view taken along a line VI—VI of FIG. 3.
Figure 7:
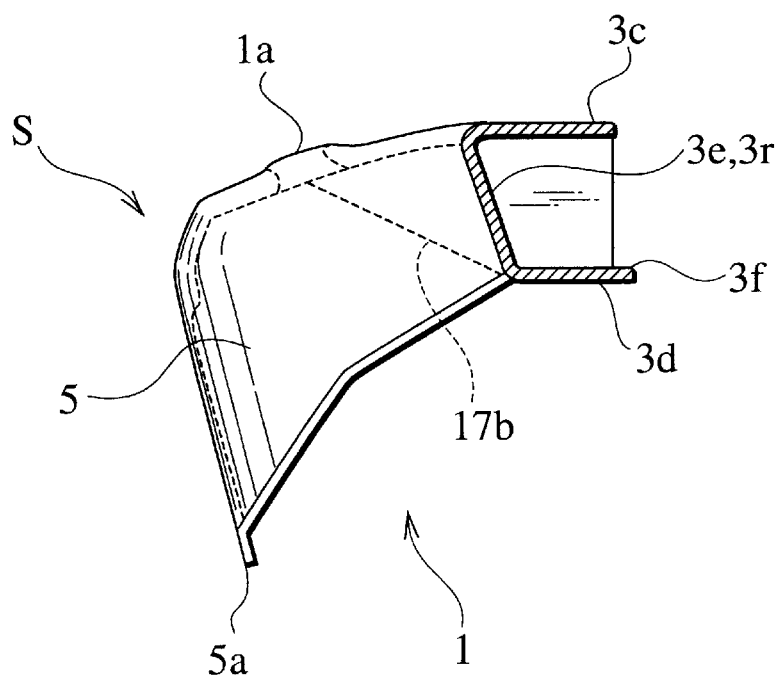
FIG. 7 is a partially-omitted front view of the structural body of the suspension attachment member.

As shown in FIG. 6 as a sectional view taken along a line VI—VI of FIG. 3, the supplementary rib 17a is positioned at the substantial center of the housing member 5 in the vehicle's front/behind direction. Further in the housing member 5, supplementary ribs 17b, 17c are formed in accordance with the connecting form similar to the supplementary rib 17a.

Having a thickness larger than that of the upper wall 5d of the housing member 5, each supplementary rib 17b is formed integrally with the upper wall 5d of the member 5. On the other hand, each supplementary rib 17c is formed so as to project obliquely at the corner between each supplementary rib 17b and the vertical wall 3e of the hood-ridge upper member 3.

In operation, when an input F is transmitted to the suspension attachment member 1 through the suspension SA as shown in FIGS. 3 and 5, it is possible to restrict the antiplane deformation of the member 1 because of its thickened structure.

Owing to the provision of the upper and lower walls 3c and 3d, the hood-ridge upper member 3 can exhibit its high bending rigidity and therefore, it is possible to prevent the member 3 from being deformed by a bending moment M1 based on the input F. Additionally, if the upper and lower walls 3c, 3d are respectively formed thicker than the vertical wall 3e, the bending rigidity per weight would be further enhanced thereby to restrict the deformation of the member 3 caused by the moment M1.

Repeatedly, the side member 7 has the joint flange 7a and the joint surface 7b both welded to the joint flange 5a of the housing member 5. Consequently, the welding strength established between the slide member 7 and the housing member 5 can accept a force fs derived from the above input F exerted on the suspension SA with a high shearing force, thereby transmitting the load certainly.

Regarding a moment Ms of FIG. 5, since the plane contact with an upper corner 7c as the center is ensured between joint flange 5a and the joint flange 7a or the joint surface 7b, it is possible to certainly transmit the force from the housing member 5 to the side member 7, accomplishing the certain load-transmission.

In this way, the input F inputted from the suspension SA can be effectively transmitted to the roof structure 11 and also the front pillar structure 9 through the side member 7 and the hood-ridge upper member 3. Accordingly, it is possible to attain the reduction in weight without increasing the plate thickness.

Moreover, owing to the provision of the hood-ridge upper member 3 with the ribs 3j, 3k, 3m, 3n, 3p and 3r, it is possible to restrict the sectional deformation of the member 3, for example, angular changes in the walls 3c, 3d, 3e originating in the member's distortion caused by the input F, whereby it can be transmitted to the roof structure 11 and also the front pillar structure 9 more certainly.

Again, since the vertical wall 3e of the hood-ridge upper member 3 is substantially parallel with the attachment axis 15 of the suspension SA, the suspension input F can be received in the plane of the vertical wall 3e of the hood-ridge upper member 3 thereby to transmit the force to the walls 3c, 3d effectively. In other words, the hood-ridge upper member 3 can be utilized as a "flexural rigidity" member, thereby accomplishing the load transmission more certainly.

Further, since the upper and lower walls 5d, 5e of the housing member 5 are substantially parallel with the attachment axis 15 of the suspension SA, the suspension input F can be received by the housing member 5, as an inplane force acting on its whole sectional area, accomplishing the certain load transmission to the side member 7.

Since the outward opening of the hood-ridge upper member 3 is closed up with joint wall 13 of the roof structure 11, it is also possible to restrict the sectional deformation of the member 3, such as the angular changes in the walls 3c, 3d, 3e originating in the member's distortion caused by the input F. Thus, the force F can be transmitted to the roof structure 11 and also the front pillar structure 9 more certainly.

Since the supplementary ribs 17a, 17b, 17c are connected with the ribs 3k, 3m, 3n, 3p through the vertical wall 3e of the member 3, it is possible to restrict the angular change between the suspension attachment member 1 and the hood-ridge upper member 3 due to the suspension input F and possible to convert the inplane force exerted on the housing member 5 into the bending of the hood-ridge upper member 3 effectively, whereby the load can be transmitted to the roof structure 11 and also the front pillar structure 9 more certainly.

Again, since the suspension attachment member 1, the hood-ridge upper member 3 and the housing member 5 are formed into one body, the number of components can be reduced thereby to facilitate the assembling work in the main product line.

The entire contents of Japanese Patent Application No. 11-264514 (filed on Sep. 17, 1999) is incorporated herein by reference.

The scope of the invention is defined with reference to the following claims.

What is claimed is:

1. A vehicle body structure, comprising:
   a suspension suspended from a vehicle body to carry a vehicle wheel;
   a suspension attachment member to which the suspension is attached;
   a suspension housing member for accommodating the suspension, the suspension housing member having its upper part joined to the suspension attachment member and the lower part to be connected to a side member constituting a lower framework of the vehicle body;
   a hood-ridge upper member joined to an upper and outer part of the suspension housing member thereby to constitute an upper framework of the vehicle body, the upper and outer part being positioned on the outside of the suspension housing member in a vehicle's width direction; wherein
   the suspension housing member and the hood-ridge upper member are formed into one casting body of light metal; and
   the hood-ridge upper member includes an upper wall, a lower wall and a vertical wall positioned inside in the vehicle's width direction to connect the upper wall with the lower wall, providing a cross section opening outward in the vehicle's width direction.

2. The vehicle body structure of claim 1, wherein
   the hood-ridge upper member is provided with at least one rib through which the upper wall, the lower wall and the vertical wall are joined each other and which extends in the vehicle's width direction.

3. The vehicle body structure of claim 1, wherein
   the hood-ridge upper member has its rear end joined to a front pillar of the vehicle body;
   the hood-ridge upper member's rear part opening outward in the vehicle's width direction is joined to a part of panel arranged to extend from a roof to the front pillar and closed up with the part.

4. The vehicle body structure of claim 1, wherein
the vertical wall of the hood-ridge upper member is arranged so as to be substantially parallel with an attachment axis of the suspension.

5. The vehicle body structure of claim 1, wherein
the suspension housing member has a wall formed to extend up and down and also positioned inside in the vehicle's width direction; and
the wall of the suspension housing member is arranged so as to be substantially parallel with an attachment axis of the suspension.

6. The vehicle body structure of claim 1, wherein
the side member has an upper joint part and a lower joint part both connected with the suspension housing member; and
the upper joint part and the lower joint part are arranged so as to be substantially parallel with an attachment axis of the suspension.

7. The vehicle body structure of claim 2, wherein
the suspension attachment member has a supplementary rib formed so as to extend from an under face of the suspension attachment member to the vertical wall of the hood-ridge upper member, the supplementary rib being positioned so as to adjoin the rib of the hood-ridge upper member through the vertical wall and overlap with the rib in the vehicle's width direction, partially.

* * * * *